(12) United States Patent  
Okabayashi

(10) Patent No.: US 9,148,534 B2  
(45) Date of Patent: Sep. 29, 2015

(54) DISPLAY INPUT DEVICE TO DISPLAY PREVIEW AND DEFAULT SETTING IMAGES, IMAGE FORMING APPARATUS, CONTROL METHOD FOR DISPLAY INPUT DEVICE

(71) Applicant: KYOCERA Document Solutions Inc., Osaka (JP)

(72) Inventor: Yoshifumi Okabayashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/485,120

(22) Filed: Sep. 12, 2014

(65) Prior Publication Data

US 2015/0085308 A1    Mar. 26, 2015

(30) Foreign Application Priority Data

Sep. 25, 2013    (JP) .................................. 2013-198878

(51) Int. Cl.
*G06K 15/00* (2006.01)
*H04N 1/00* (2006.01)
*G03G 15/00* (2006.01)

(52) U.S. Cl.
CPC ......... *H04N 1/00411* (2013.01); *G03G 15/502* (2013.01); *H04N 1/00392* (2013.01); *H04N 2201/0094* (2013.01)

(58) Field of Classification Search
CPC ............ G03G 15/502; H04N 1/00411; H04N 1/00392; H04N 2201/0094
USPC .................................. 358/1.1–3.29, 1.11–1.18
See application file for complete search history.

(56) References Cited

U.S. PATENT DOCUMENTS

| | | | |
|---|---|---|---|
| 2006/0017855 A1* | 1/2006 | Yamada ......................... | 348/650 |
| 2007/0185979 A1* | 8/2007 | Yoshida ......................... | 709/220 |
| 2007/0195386 A1 | 8/2007 | Shinohara et al. ............. | 358/527 |
| 2008/0218776 A1* | 9/2008 | Takami et al. ................. | 358/1.6 |
| 2011/0317193 A1 | 12/2011 | Iwase et al. ................... | 358/1.13 |

FOREIGN PATENT DOCUMENTS

JP    2007-200304 A    8/2007

* cited by examiner

*Primary Examiner* — Marcellus Augustin
(74) *Attorney, Agent, or Firm* — Stein IP, LLC

(57) ABSTRACT

A display input device includes a storage unit, an operation input unit, and a display unit. The storage unit stores a set setting value and a default setting value of each setting item. The operation input unit accepts setting of the setting value. The display unit displays a screen for selecting the setting item and for setting the setting value of the selected setting item. In addition, the display unit alternately displays a finished image indicating a job execution result on which the set setting value is reflected, and a default setting image indicating a job execution result based on the default setting value on which the default setting value is reflected, by switching between them.

13 Claims, 11 Drawing Sheets

FIG.8
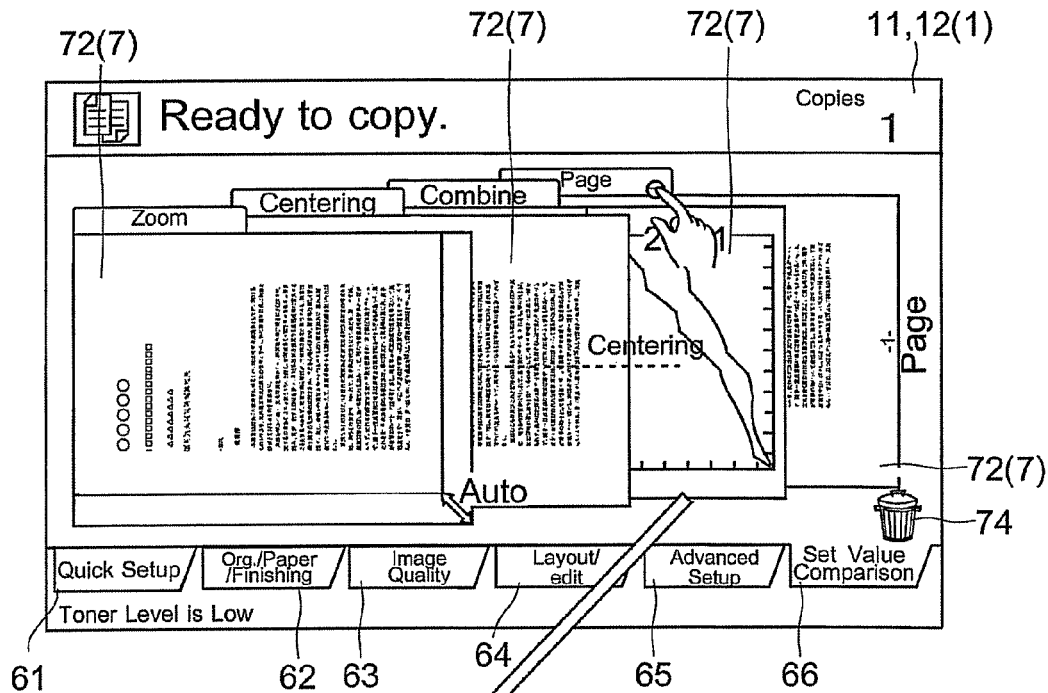
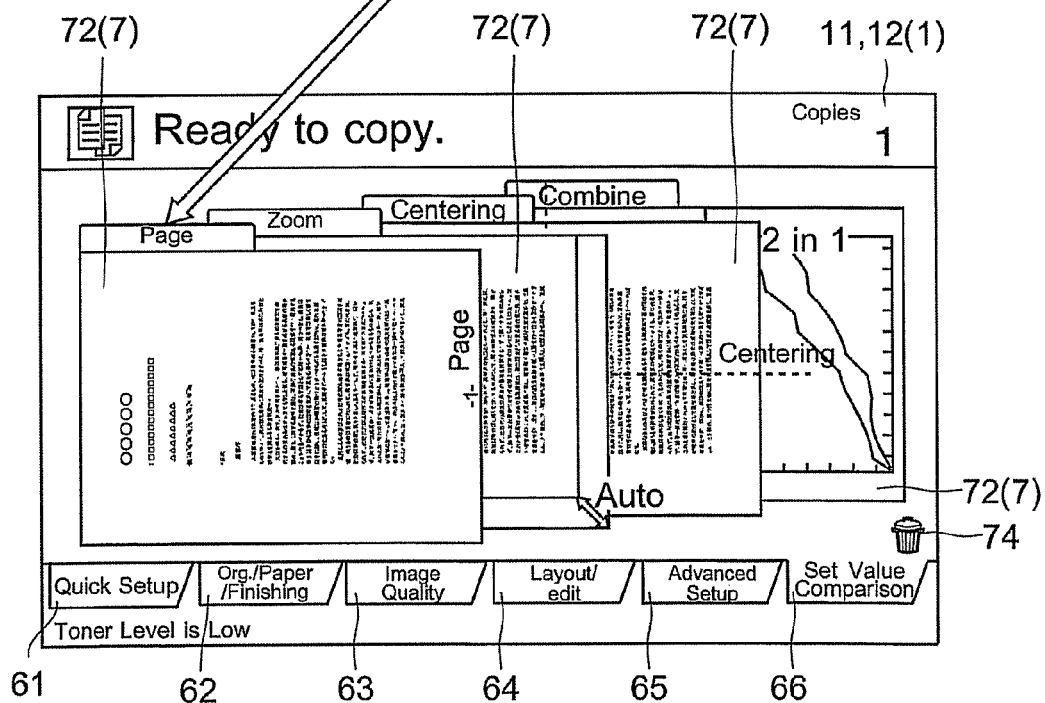

DISPLAY INPUT DEVICE TO DISPLAY PREVIEW AND DEFAULT SETTING IMAGES, IMAGE FORMING APPARATUS, CONTROL METHOD FOR DISPLAY INPUT DEVICE

CROSS-REFERENCE TO RELATED APPLICATIONS

This application is based upon and claims the benefit of priority from the corresponding Japanese Patent Application No. 2013-198878 filed Sep. 25, 2013, the entire contents of which are incorporated herein by reference.

BACKGROUND OF THE INVENTION

The present disclosure relates to a display input device including a display device for displaying an image of a key or the like for setting, and to a control method for the display input device. In addition, the present disclosure relates to an image forming apparatus equipped with the display input device.

Conventionally, in order to improve convenience of users or satisfaction of purchasers, versatility of image forming apparatuses (the number of settable setting items) has been increased. However, as the versatility is improved more, a procedure of setting becomes more complicated and harder to understand, and hence it takes more effort and time to perform various setting (setting items and values for printing in the image forming apparatus, for example).

Therefore, devices for dissolving the complicated setting may be made. For instance, there is known an information processing apparatus, for example, in which printing condition setting data (operation conditions) of first and second printers selected in a driver selection screen are read out, and individual setting items are compared. As a result of the comparison, a display color of different setting values is set to red color, a display color of setting values that are the same but are different from a default value is set to blue color, and a display color of setting values that are the same as the default value is set to black color. In this way, a different part of two or more operation conditions selected from a plurality of operation conditions set for a peripheral device such as a printer or a scanner is explicitly displayed.

In the image forming apparatus, a lot of (for example, a few tens to a few hundreds) settable setting items are prepared for using individual functions (such as a copying function and a document reading function). A user selects a desired setting item among the setting items by inputting on the display input device including a display unit and a touch panel unit. Then, a setting value is set for the selected setting item.

In job setting, in order to save time and effort to set a setting value for every setting item, a default setting value may be set for each setting item in the image forming apparatus. As to a setting item of which use or not use can be selected (for example, double-sided printing or other setting items without which a job can be executed), the default setting value is usually "not use (not executed)" (though there is an exception). On the other hand, as to a setting item such as zoom magnification or density for which a specific value is required (a setting item that is not a type of which use or not use is simply selected), the default setting value is a value that is recognized to be used most frequently. For instance, a default setting value for zooming is actual size, and a default setting value of density is standard density. Then, the job is executed based on the default setting value for a setting item that the user has not set.

Here, in the display input device, it may be possible to display a preview image (finished image) for checking a result of executing the job based on the set setting value. The user checks the preview image so as to check whether or not there is an omission of setting or a setting error. Thus, it is possible to avoid that a result of the job execution is against the user's intention.

However, conventionally, even if the preview image is displayed, information of the setting item of which the user has set the setting value is not appropriately displayed within a single screen including the preview image. Therefore, there is a problem that it is difficult to understand which setting item is different from the default setting value. In addition, because the items to be compared are not displayed, there is a problem that it is difficult to understand (check) a difference between a case where a setting value of the selected setting item is set and a case where the setting value is not set.

Note that because a setting condition is compared between a plurality of printer drivers in the above-mentioned known technique, a difference of the printing condition between printers is easily understood. However, because there is no description about a preview image, the problem of the difficulty to understand the setting cannot be dissolved even if the above-mentioned preview image is displayed.

SUMMARY OF THE INVENTION

The present disclosure is made in view of the above-mentioned problem of the conventional technique. A display input device according to a first aspect of the present disclosure includes a storage unit, an operation input unit, and a display unit. The storage unit stores a set setting value and a default setting value of each setting item used in a case where the setting value is not set. The operation input unit accepts setting of the setting value. The display unit displays a screen for selecting the setting item and for setting a setting value of the selected setting item. In addition, the display unit alternately displays a finished image for checking a result when a job is executed with the set setting value reflected, and a default setting image on which the default setting value is reflected for checking a result when the job is executed based on the default setting value, by switching between them.

Further features and advantages of the present disclosure will become apparent from the description of embodiments given below.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 8 is a diagram for explaining an example of selecting a separate setting value image in the operation panel according to the embodiment.

DETAILED DESCRIPTION OF THE EMBODIMENTS

Now, with reference to FIGS. 1 to 12, an embodiment is described. In the following description, a multifunction peripheral 100 (corresponding to the image forming apparatus) including an operation panel 1 (corresponding to the display input device) is exemplified and described. However, elements such as structures and layouts described in this embodiment are merely examples without limiting the scope of the disclosure.

(Outline of Image Forming Apparatus)

Figure 1:
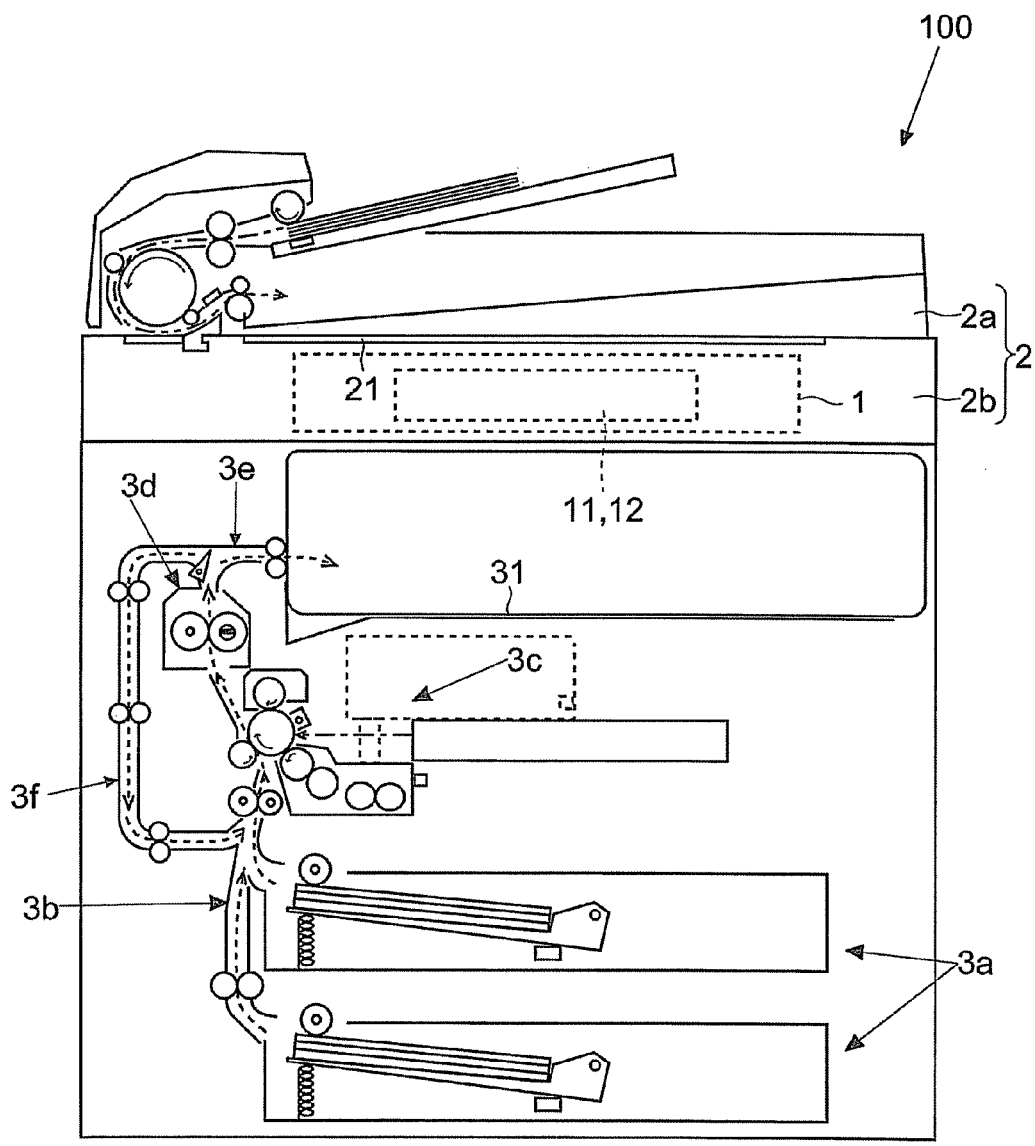
FIG. 1 is a diagram illustrating an example of a multifunction peripheral according to an embodiment.

First, with reference to FIG. 1, an outline of the multifunction peripheral 100 according to the embodiment is described.

As illustrated in FIG. 1 by a broken line, on the front face of the multifunction peripheral 100, there is disposed the operation panel 1 for making various settings for the multifunction peripheral 100 (details are described later). In addition, as illustrated in FIG. 1, the multifunction peripheral 100 of this embodiment is equipped with a document feeder unit 2a and an image reader unit 2b disposed on an upper part. The document feeder unit 2a transports document sheets to a reading position automatically and successively. The image reader unit 2b reads the transported document sheet or a document placed on a contact glass so as to generate image data.

In addition, the multifunction peripheral 100 includes inside a paper sheet feeder unit 3a, a transport unit 3b, an image forming unit 3c, a fixing unit 3d, a discharge transport unit 3e, a double-sided transport unit 3f, and the like. The paper sheet feeder unit 3a feeds paper sheets one by one to the transport unit 3b. The transport unit 3b transports the paper sheet to a discharge tray 31. The image forming unit 3c forms a toner image based on image data. The fixing unit 3d fixes the toner image transferred onto the paper sheet. The discharge transport unit 3e discharges the paper sheet after the toner image is fixed (printed paper sheet) onto the discharge tray 31. The discharge transport unit 3e transports the paper sheet in the direction toward the double-sided transport unit 3f when performing double-sided printing. The double-sided transport unit 3f transports the paper sheet whose one side is printed to an upper stream side of the image forming unit 3c.

(Operation Panel 1)

Figure 2:
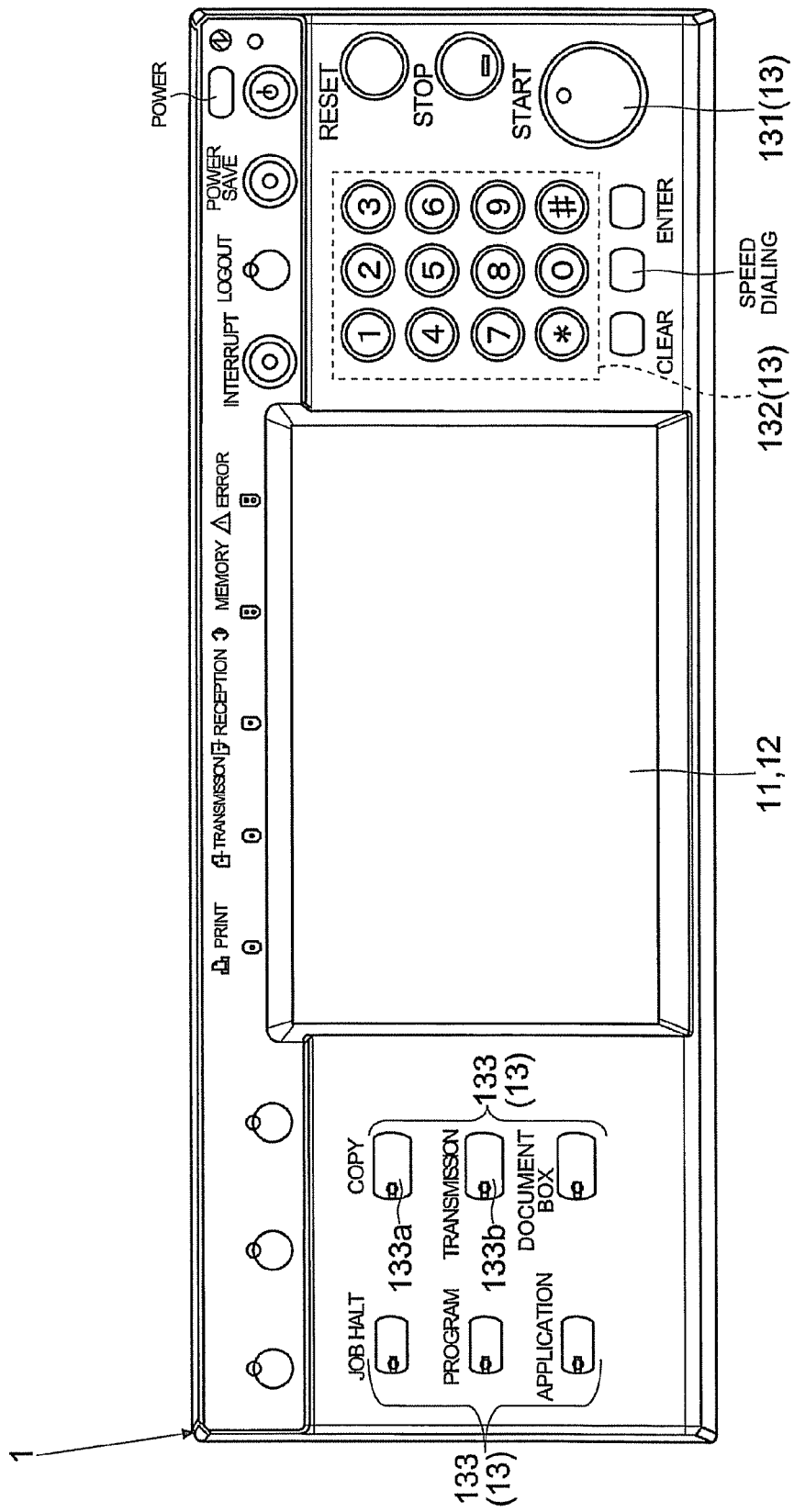
FIG. 2 is a diagram illustrating an operation panel according to the embodiment.

Next, the operation panel 1 as the display input device according to the embodiment is described with reference to FIG. 2.

The operation panel 1 is disposed on the upper front of the multifunction peripheral 100 (see FIG. 1). Further, as illustrated in FIG. 2, the operation panel 1 includes a display unit 11, a touch panel unit 12 (corresponding to the operation input unit), various hardware keys 13 (corresponding to the operation input unit). The operation panel 1 includes, as the hardware keys 13, a start key 131 for instructing to start a process such as a copying process and a ten-key unit 132 for inputting numbers.

The display unit 11 is a liquid crystal display panel. Note that the display unit 11 may be other type of panel such as an organic EL panel. The display unit 11 displays a menu for performing setting of the multifunction peripheral 100 or a screen in which keys are arranged, and an image. The user designates a key displayed on the display unit 11 so as to input various settings of the multifunction peripheral 100. In addition, the display unit 11 displays various images and screens such as a message of a state of the multifunction peripheral 100.

In addition, the touch panel unit 12 is disposed on (an upper surface of) the display unit 11. The touch panel unit 12 is disposed for detecting coordinates at which the user touches. By comparing a display position of a key with the touched position, the key designated by the user is specified, and the user's input is accepted. Note that the touch panel unit 12 of this embodiment can detect a plurality of touched points. For instance, a capacitive touch panel is adopted.

In addition, the operation panel 1 includes a plurality of function selection keys 133. The user presses one of the function selection keys 133 so as to select a function to use of the multifunction peripheral 100. The function selection keys 133 include a copying key 133a to be pressed when copying function is used, a transmission key 133b to be pressed when transmitting image data read by the image reader unit 2b to a computer 200 or a FAX apparatus 300. Further, when one of the function selection keys 133 is pressed, the display unit 11 selects a setting item concerning the selected function (pressed function selection key 133) and displays a setting screen for determining a setting value of the selected setting item.

(Hardware Structure of Multifunction Peripheral 100 and the Like)

Figure 3:
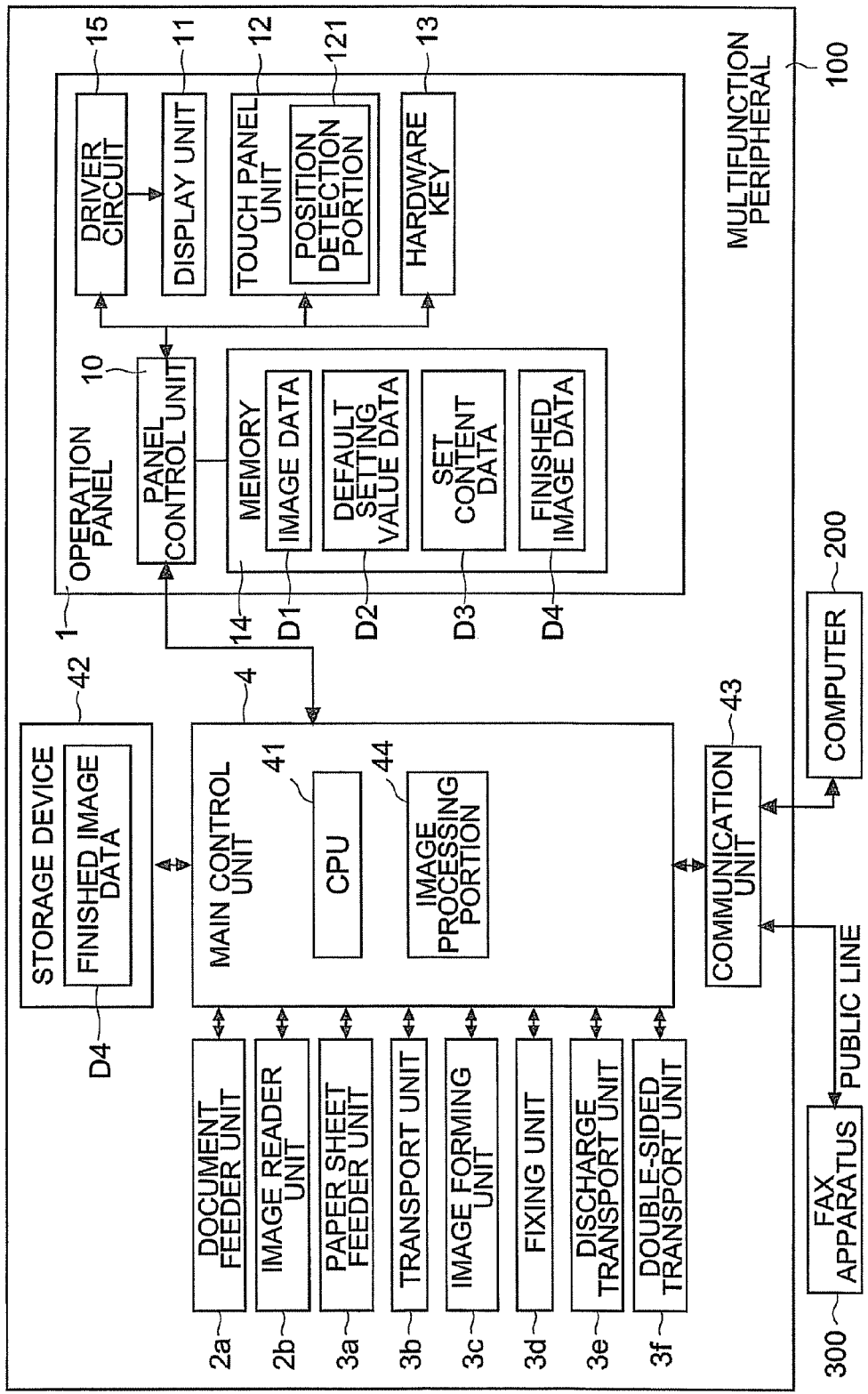
FIG. 3 is a diagram illustrating an example of a hardware structure of the multifunction peripheral and the operation panel.

Next, with reference to FIG. 3, an example of a hardware structure of the multifunction peripheral 100 and the operation panel 1 according to the embodiment is described.

First, a main control unit 4 is disposed in a main body of the multifunction peripheral 100. The main control unit 4 is connected to the operation panel 1, the document feeder unit 2a, the image reader unit 2b, the paper sheet feeder unit 3a, the transport unit 3b, the image forming unit 3c, the fixing unit 3d, the discharge transport unit 3e, and the like, so as to control operations of these units.

The main control unit 4 includes a controlling element such as a CPU 41 and a circuit. The CPU 41 performs calculation and the like based on a control program and control data stored in a storage device 42, so as to control individual units of the multifunction peripheral 100. The storage device 42 is connected to the main control unit 4. The storage device 42 is a combination of nonvolatile and volatile storage devices including a ROM, a RAM, an HDD, and the like. The storage device 42 can store a control program of the multifunction peripheral 100 and various data such as control data, setting data, and image data.

Further, the main control unit 4 is connected to a communication unit 43. The communication unit 43 is connected to the computer 200 and the FAX apparatus 300 (only one of each is illustrated in FIG. 3 for convenience sake) via a network, a public line, or the like. The main control unit 4 can transmit data including the image data via the communication unit 43 to the external computer 200 or the FAX apparatus 300 on the other party (a scanner function and a FAX transmission function). In addition, the main control unit 4 can also perform printing based on the image data transmitted from the external computer 200 or the FAX apparatus 300 on the other party and is input to the multifunction peripheral 100 (a printer function and a FAX reception function).

In addition, the main control unit 4 includes an image processing portion 44 for performing image processing on the image data obtained by reading a document or obtained by reception via the communication unit 43. The image data processed by the image processing portion 44 is used for printing or transmission, or is stored in the storage device 42.

In addition, the display unit 11 can display an image for checking whether or not settings are appropriate before executing the printing or transmission job, which is a finished image 7 on which the setting value set on the operation panel 1 is reflected. The image processing portion 44 generates the image data necessary for the display unit 11 to display this finished image 7.

In addition, the main control unit 4 recognizes an input performed by the operation panel 1 and controls the multifunction peripheral 100 to perform the job such as copying, document reading, or transmission in accordance with the user's setting. The operation panel 1 of this embodiment includes a panel control unit 10, the display unit 11, the touch panel unit 12, the hardware keys 13 (for example, the ten-key unit 132 and the start key 131), a memory 14 (corresponding to the storage unit), a driver circuit 15, and the like.

The panel control unit 10 includes a CPU, an IC, and the like. The panel control unit 10 controls display of the display unit 11. The main control unit 4 transmits data necessary for display to the panel control unit 10. The panel control unit 10 referred to the storage content of the memory 14 for storing data such as image data D1 for display, a program for display and operation control, and the like based on an instruction from the main control unit 4. Further, the panel control unit 10 gives an instruction of display content to the driver circuit 15 that actually controls display of the display unit 11.

In addition, the panel control unit 10 receives an output of the touch panel unit 12 so as to detect and recognize the touched position (coordinates). For this position detection, the touch panel unit 12 is provided with a position detection portion 121. For instance, the position detection portion 121 is an IC for detecting a touched position (coordinates of a touched point). The panel control unit 10 recognizes the touched position based on an output of the touch panel unit 12 (position detection portion 121). Further, the panel control unit 10 compares the touched position with image data of the screen displayed on the display unit 11 when the position is touched, so as to recognize a key or a button displayed at the touched position. The data such as a table indicating correspondence between an output of the touch panel unit 12 and the position (coordinates) is stored in the memory 14. The memory 14 includes a ROM and a RAM. In this way, the panel control unit 10 can recognize the key operated by the user.

(Selection of Setting Item and Setting of Setting Value)

Figure 4:
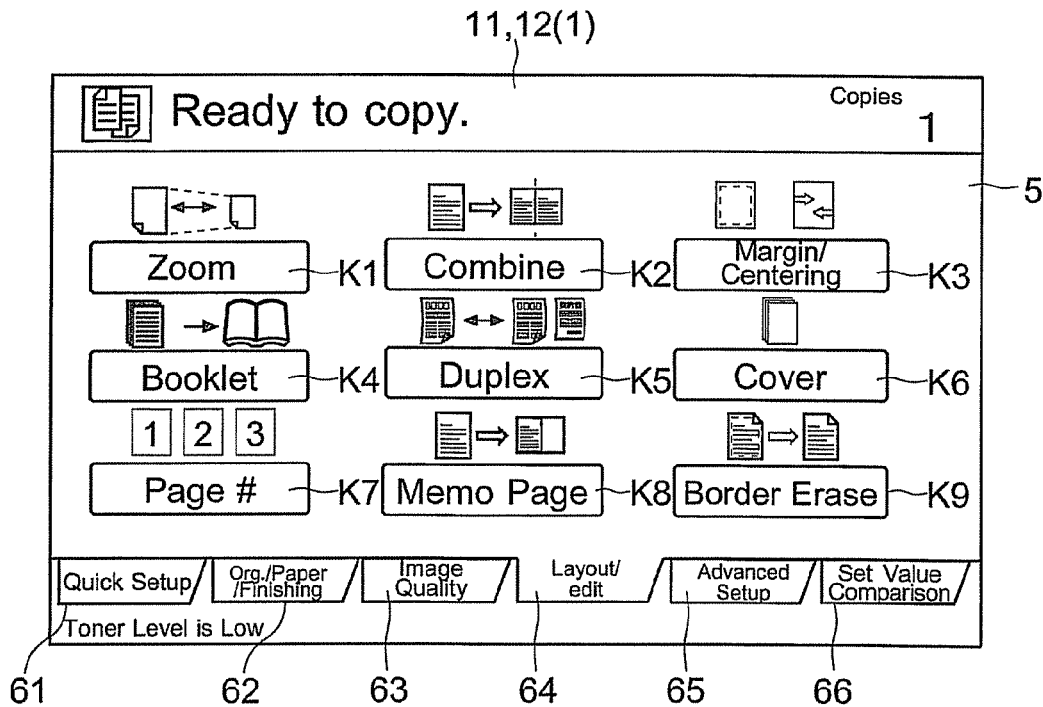
FIG. 4 illustrates an example of a selection screen in a state where a setting value is not particularly set.
Figure 5:
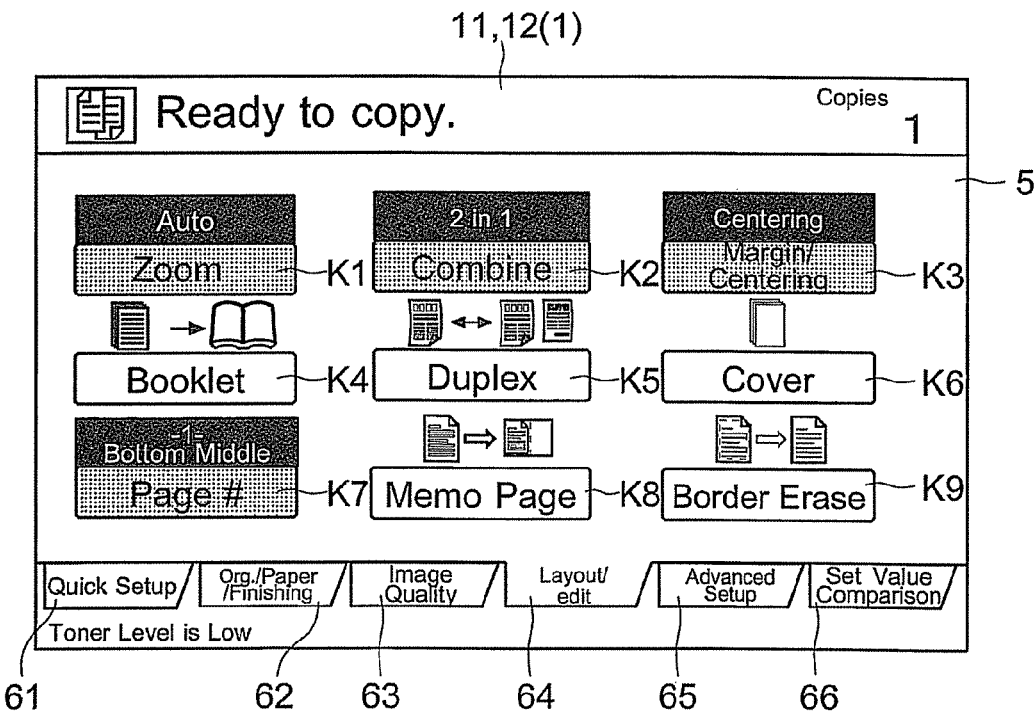
FIG. 5 illustrates an example of the selection screen in a state where the setting value is set.

Next, with reference to FIG. 4 and FIG. 5, selection of a setting item and setting of a setting value of the selected setting item on the operation panel 1 according to the embodiment are described.

As described above, in the multifunction peripheral 100 of this embodiment, the user can select a function to be used such as the copying function or the transmission function using the function selection key 133. Note that the multifunction peripheral 100 also has other functions such as the printer function for printing based on image data and the setting data transmitted from the computer 200, and a box function for accumulating image data obtained by reading so as to reuse the image data.

In the following description, selection of a setting item and setting of a setting value of the selected setting item when the copying function is used are exemplified and described. The copying function is a function of reading a document and printing based on the read image data so as to copy the document. Further, a plurality of setting items are prepared for the copying function. Note that a plurality of setting items are also used for other functions such as the transmission function.

When the copying key 133a among the function selection keys 133 is pressed, the panel control unit 10 controls the display unit 11 to display a selection screen 5 for selecting the setting item about the copying function. The panel control unit 10 controls the display unit 11 to display an quick setup tab 61, a org/paper/finishing tab 62, an image quality tab 63, a layout/edit tab 64, an advanced setup tab 65, and a set value comparison tab 66 in various selection screens 5.

Because there are many setting items that are prepared in advance and can be selected, it is difficult to display all keys for selecting the setting item (setting item selection keys) in one screen. In addition, the keys should be displayed so that a size of each key is not too small. Therefore, the setting items are classified into one or more categories (tabs).

When a tab (one of tab 61 to 65) other than the set value comparison tab 66 is touched, the panel control unit 10 controls the display unit 11 to display the selection screen 5 for selecting a setting item associated with the touched tab (a setting item classified to belong a category of the touched tab in advance). In the selection screen 5, a list of selection keys for selecting a setting item is displayed.

FIG. 4 and FIG. 5 illustrate an example of the selection screen 5 that is displayed when a display position of the layout/edit tab 64 is touched. In the selection screen 5 corresponding to the layout/edit tab 64, keys for selecting setting items about a layout of pages in copying and editing of print content (setting item selection keys) are arranged. Specifically, in the selection screen 5 corresponding to the layout/edit tab 64, there are arranged a plurality of setting item selection keys such as a zoom key K1, a combine key K2, a margin/centering key K3, a booklet key K4, a duplex key K5, a front cover key K6, a page number insertion key K7, a memo page key K8, and a border erase key K9.

Note that when the quick setup tab 61 is touched, the selection screen 5 is displayed in which keys corresponding to the setting item that is selected by the user in advance or is initially set as being frequently set based on experience are arranged. When the org/paper/finishing tab 62 is touched, there is displayed the selection screen 5 for selecting a setting item about the document or the paper sheet such as a document size, the paper sheet size, directions of the document and the paper sheet, a paper feed source, and the like. When the image quality tab 63 is touched, the selection screen 5 for selecting a setting item about image quality such as density of a printed matter is displayed. When the advanced setup tab 65 is touched, the selection screen 5 for selecting a setting item that does not belong to any one of the tabs 61 to 65 is displayed. Note that illustration and description of the selection screens 5 corresponding to the tabs 61 to 63 and 65 are omitted.

When the display position of the setting item selection key is touched, the panel control unit 10 controls the display unit 11 to display a setting value setting screen (not shown) for setting the setting value of the selected setting item. Note that the image data D1 (see FIG. 3) necessary for displaying the selection screen 5 or the setting value setting screen is stored in the memory 14 (see FIG. 3). The panel control unit 10 uses the image data D1 in the memory 14 so as to control the display unit 11 to display the selection screen 5 corresponding to an operation of the tab and controls the display unit 11 to display the setting value setting screen corresponding to an operation of the setting item selection key.

By touching the display position of the setting item selection key displayed on the selection screen 5, the setting item corresponding to the setting item can be selected. In a zoom setting screen displayed when the zoom key K1 is operated, a zoom magnification in copying (a size ratio of the copy to the document) can be set as the setting value. In a combine setting screen displayed when the combine key K2 is operated, it is possible to set whether or not to combine a plurality of pages into one page of the printed matter, and how many pages are to be combined, as the setting values. In the setting screen displayed when the margin/centering key K3 is operated, it is possible to set margins in one page of the printed matter and whether or not to perform centering as the setting values. In a booklet setting screen displayed when the booklet key K4 is operated, it is possible to set whether or not to perform booklet print, and the like, as the setting values. In a double-sided setting screen displayed when the duplex key K5 is operated, it is possible to set whether or not to perform the double-sided printing as the setting values. In the front cover setting screen displayed when the front cover key K6 is operated, it is possible to set whether or not to insert a front cover such as blank paper as a front page of one copy, and the like, as the setting values. In a number setting screen displayed when the page number insertion key K7 is operated, it is possible to set whether or not to add page numbers in the printed matter, which position the page numbers are added at, and the like, as the setting values. In a memo setting screen displayed when the memo page key K8 is operated, it is possible to set whether or not to reduce a document size so as to generate a margin for memo, and the like, as the setting values. In a border erase setting screen displayed when the border erase key K9 is operated, it is possible to set whether or not to have a blank margin of a predetermined length from an edge of the printed matter, a value of the predetermined length, and the like, as the setting values.

In this way, the panel control unit 10 controls the display unit 11 to display a plurality of tabs. Further, when the touch panel unit 12 detects a touch of the display position of the tab, the panel control unit 10 controls the display unit 11 to display the setting item selection key classified with reference to the tab. Then, the panel control unit 10 recognizes the selected setting item based on an output of the touch panel unit 12 and an output of the hardware key 13, recognizes the operation of setting the setting value on the setting screen of the selected setting item, and accepted the same.

Here, as illustrated in FIG. 4 and FIG. 5, the panel control unit 10 controls the display unit 11 to display a pattern or an icon indicating the setting item to accompany the setting item selection key corresponding to the setting item of which the setting value is not set by the user. On the other hand, the panel control unit 10 controls the display unit 11 to display the set setting value of the setting item of which the setting value is set by the user, instead of the pattern or the icon. In this way, in accordance with whether or not the setting value is set, a display form of a display field of the setting value is changed. For instance, the display form is changed by black and white reversal or display color change of the setting item selection key.

FIG. 4 and FIG. 5 illustrate an example in which the user has set setting values in four setting items. In other words, setting values of four setting items are changed from default setting values. Specifically, in the example of FIG. 5, the setting value "Auto" is set for the zoom setting item (the default value is "100%, i.e., actual size"), the setting value "2 in 1" is set for the combine setting item (the default value is "not combine"), the setting value "Centering" is set for the margin/centering setting item (the default value is "not centering"), and the setting value "put page number in the bottom middle in the form of -#-" is set for the page number insertion setting item (the default value is "don't put page numbers").

(Default Setting Value)

Here, with reference to FIG. 3, the default setting values are described.

In the multifunction peripheral 100 of this embodiment, many (for example, total a hundred or more) selectable or settable setting items are prepared for using the individual functions.

Here, in order to execute a job on which user's intention is completely reflected, it is ideal to determine the setting value for each of the setting items of the function to be used (for example, the copying function). However, in this case, it takes too much time and effort for setting. Therefore, the default setting value is set for each setting item.

For instance, as to the setting item for setting whether or not to use the setting item (function) such as the page number insertion, the combine printing, or the margin/centering, the default setting value is "not use (not execute)" the setting item (function). On the other hand, as to the setting item such as the zoom magnification or the density, which requires to set a specific value instead of simply setting Yes or No (instead of simply setting to use or not the setting item or function), the default setting value is a value that is regarded to be used most frequently (for example, "actual size" for the zoom setting item).

For instance, data indicating default setting values of the individual setting items (default setting value data D2) is stored in the memory 14 (see FIG. 3). The memory 14 also stores the set setting values. Alternatively, they may be stored in the storage device 42. Then, as to the setting item of which the setting value is not set by the user, the main control unit 4 executes the job using the default setting value. In the multifunction peripheral 100 of this embodiment, as the default values, the zoom magnification is set to the actual size, and the density is set to the standard density. Therefore, when the document is set and the start key 131 is pressed without changing the setting values, the multifunction peripheral 100 of this embodiment performs copying with the standard density in the actual size.

(Finished Image 7 and Default Setting Image 8)

Figure 6:
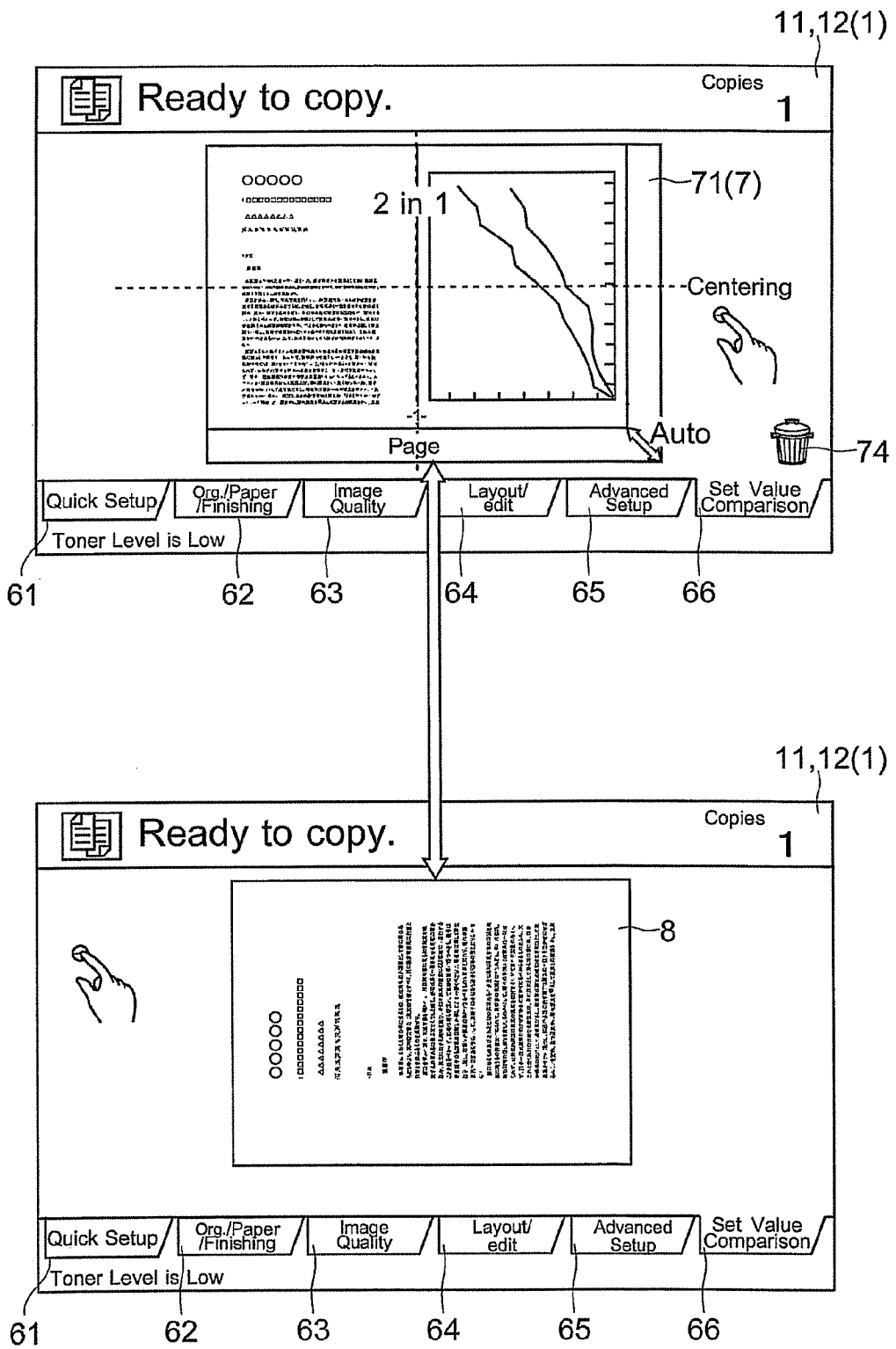
FIG. 6 is a diagram illustrating an example of display switching between a finished image and a default setting image in the display input device according to the embodiment.

Next, with reference to FIG. 6, displays of the finished image 7 and the default setting image 8 in the operation panel 1 according to the embodiment are described.

Note that in the following description with reference to the drawings, there is described a case where the same setting as the case of FIG. 5 is performed. Specifically, the zoom setting value is "Auto", the combine setting value is "2 in 1", the margin/centering setting value is "Centering", and the page number insertion setting value is "put page number in the bottom middle in the form of -#-")

The operation panel 1 (the display unit 11, the touch panel unit 12, the hardware key 13, and the like) accepts the user's setting input of the setting value. Then, the operation panel 1 (display unit 11) displays the finished image 7 on which the set setting value is reflected (image indicating an example of the execution result of the job). By viewing this finished image 7, the user can check whether or not there is an omission of setting and whether or not the selected setting item and the set setting value match with the user's intention. In this way, it is possible to prevent an omission of setting a setting error, and to prevent that a wasteful job is executed with content that the user does not intend.

Here, there is a case where it is difficult to understand a difference between the case where the setting value is set and the case where the setting value is not set (the case of the default setting value) by viewing the finished image 7. Therefore, the operation panel 1 (display unit 11) can display the default setting image 8 on which the default setting value is reflected for checking a result when the job is executed based on the default setting value by satisfying a predetermined condition or by a simple operation (by a single operation), following the finished image 7 (or instead of the finished image 7). In this way, the user can visually compare the finished image 7 with the default setting image 8 so as check how the result obtained by setting the setting value is different from that based on the default value.

When the display position of the set value comparison tab 66 is touched, the panel control unit 10 controls the display unit 11 to display the finished image 7. Note that the panel control unit 10 may control the display unit 11 to display the finished image 7 when the job execution is instructed by pressing the start key 131 or the like. In this way, when the display position of the set value comparison tab 66 is operated, the display unit 11 displays an all setting value image 71 on which all the setting values set by the user as a first stage of the finished image 7. In this way, the finished image 7 (all setting value image 71) can be displayed by a simple operation of touching the set value comparison tab 66 disposed in each selection screen 5.

When the display position of the set value comparison tab 66 is touched, the panel control unit 10 controls the display unit 11 to display the all setting value image 71 on which all the setting values set by the user are reflected as the first stage of the finished image 7. The setting value changed by the user from the default value (setting value set by the user) is stored as set content data D3.

Here, the finished image 7 may be displayed with reference to (by using) the image data obtained by reading one or more pages of document sheets. In this case, when the finished image 7 is displayed, in a case where document sheets are set on the document feeder unit 2a before executing the job, the document feeder unit 2a transports one or more document sheets so that the image reader unit 2b reads the one or more document sheets. In a case where document sheets are not set on the document feeder unit 2a, the image reader unit 2b reads a document placed on a place-reading contact glass 21 (see FIG. 1):

Note that when the document is read for displaying the finished image 7, the document read for displaying the finished image 7 may be put back to the original set position before the job is executed. Alternatively, it is possible to configure to execute the job by using the image data obtained by reading for displaying the finished image 7 so that it is not necessary to put back the document.

When the finished image 7 is displayed based on the image data of the document read actually, the storage device 42 or the memory 14 stores the image data of the one or more document sheets obtained by reading. Then, the panel control unit 10 (or the image processing portion 44) performs image processing on the image data obtained by reading corresponding to all the set setting values (or the default setting value for the setting item that is not set), and performs image processing for matching the number of dots with that of a display area of the finished image 7 (reducing process), so as to generate a finished image data D4 for displaying the all setting value image 71.

In addition, image data prepared in advance (image data used fixedly for displaying the finished image 7, or template image data) may be used as image data to be a base of displaying the finished image 7. In this case, the image data to be a base of displaying the finished image 7 is stored in advance in the memory 14 or the storage device 42.

When using image data prepared in advance, the panel control unit 10 (or the image processing portion 44) reads out the image data prepared in advance, and performs image processing on the image data prepared in advance corresponding to all the set setting values (or the default setting value for the setting item that is not set), so as to generate the finished image data D4 for displaying the all setting value image 71. In addition, the image processing for matching the number of dots with that of the display area of the finished image 7 is also performed as necessary.

Then, the panel control unit 10 controls the display unit 11 to display the all setting value image 71 based on the finished image data D4 for displaying the generated all setting value image 71.

The all setting value image 71 illustrated as an example in the upper side in FIG. 6 indicates a state where the setting values "2 in 1", "Page number insertion", "Centering", and "Automatic zoom" are reflected. In addition, in order that the user can easily understand which setting value and setting item are set, a character string indicating the set setting value or the setting item is added to the all setting value image 71. In this way, it is easy to understand which setting value and setting item are set, and which setting value and setting item are reflected on the finished image 7.

Specifically, the diagram on the upper side of FIG. 6 indicates an example in which the panel control unit 10 controls the display unit to display character strings such as "2 in 1" corresponding to the combine printing setting value, "Page" corresponding to the page number insertion, "Centering" corresponding to the margin/centering, and "Auto" corresponding to the zoom setting value. Note that the displayed character string and the display position of the character string are determined in advance so that the character string is displayed at a part having a large influence when the setting value is set (for easy understanding).

Here, when a predetermined first switching condition is satisfied, or when the touch panel unit 12 accepts a predetermined first switching operation, in a state of displaying the all setting value image 71, the panel control unit 10 controls the display unit 11 to display the default setting image 8 instead of (successively to) the all setting value image 71. In this way, the display unit 11 alternately displays the finished image 7 for checking a result when the job is executed based on all the set setting values reflected (the all setting value image 71 on which all the set setting values are reflected) and the default setting image 8 on which the default setting values are reflected for checking a result when the job is executed based on the default setting values, by switching between them. In this way, the user can visually compare the finished image 7 with the default setting image 8. Therefore, the user can easily check a difference between the case where the setting value of the selected setting item is set and the case where the same is not set. Specifically, when the first switching condition is satisfied, or when the operation input unit (the touch panel unit 12, the hardware key 13, and the like) accepts the first switching operation, the display unit 11 switches the display from the all setting value image 71 to the default setting image 8 in the case where the all setting value image 71 is displayed, and switches the display from the default setting image 8 to the all setting value image 71 in the case where the default setting image 8 is displayed. In this way, the finished image 7 and the default setting image 8 are displayed alternately by switching (so that a different part is emphasized in an animated manner). Therefore, the user can visually compare the finished image 7 with the default setting image 8 so as to check a difference between a result obtained by setting the setting value and a result obtained by the default setting. In addition, the user can visually compare the finished image 7 with the default setting image 8 repeatedly. In addition, because of the switching display, the finished image 7 and the default setting image 8 can be largely displayed so that the user can view them without difficulty. In addition, the user can visually compare the result of the default setting with the result of the set setting value in one screen. Therefore, the user can easily understand how the process is performed by the selected setting item and the setting value (contents of the setting item and the setting value).

The default setting image 8 may be based on image data of the document that is actually read. In this case, based on the image data of one or more document sheets obtained by reading for displaying the finished image 7 (the all setting value image 71), the panel control unit 10 (or the image processing portion 44) performs image processing using the default setting values for all the setting items and performs image processing for matching the number of dots with that of the display area of the finished image 7 (reducing process), so as to generate image data for displaying the default setting image 8. On the other hand, it is possible to display the default setting image 8 by using the image data for displaying the default setting image prepared in advance. In this case, the same image is displayed every time as the default setting image 8.

The predetermined first switching condition can be determined appropriately. In the operation panel 1 of this embodiment, the first switching condition is that a predetermined period of time (for example, approximately 5 to 10 seconds) has passed after the input to the operation panel 1 (touch of the touch panel unit 12, the hardware key 13, or the function selection key 133) is vanished (for example, the panel control unit 10 counts the time).

In addition, a predetermined first switching operation can be determined appropriately. In the operation panel 1 of this embodiment, the first switching operation is a long press to the touch panel unit 12 (continuous touch at the same position for a predetermined period of time such as approximately one to a few seconds). Note that the first switching operation may be other gesture operations such as a flick operation.

Further, when the predetermined first switching condition is satisfied, or when the touch panel unit 12 accepts the predetermined first switching operation, in a state of displaying the default setting image 8, the panel control unit 10 controls the display unit 11 to display the all setting value image 71 that was displayed before, switching from the default setting image 8. By switching between the default setting image 8 and the all setting value image 71, the two images can be easily compared with each other.

(Display of Finished Image 7 for Each Setting Item)

Figure 7:
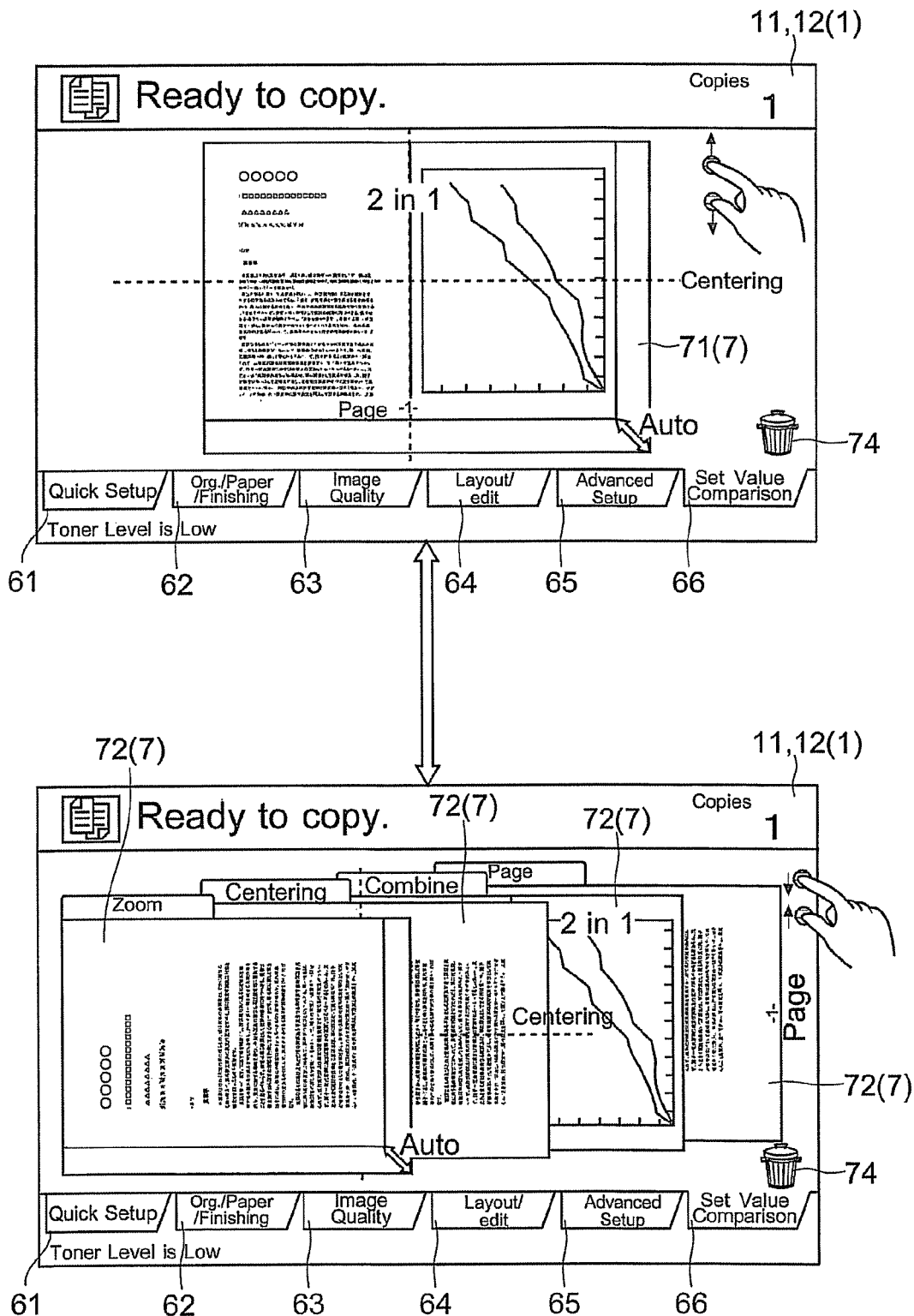
FIG. 7 is a diagram illustrating an example of a display of the finished image of each setting item (setting value) in the operation panel according to the embodiment.
Figure 9:
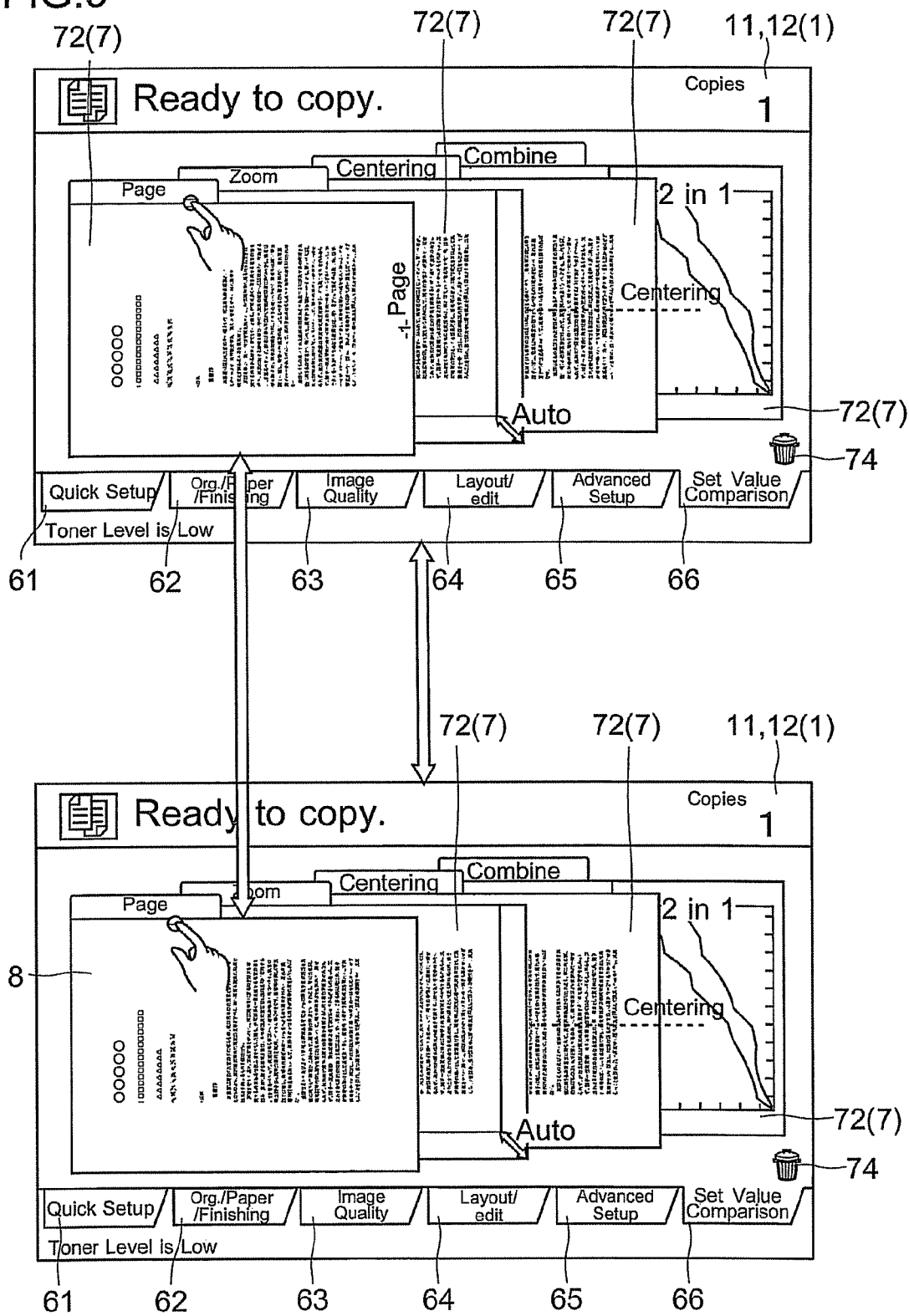
FIG. 9 is a diagram for explaining an example of display switching between the separate setting value image and the default setting image according to the embodiment.

Next, with reference to FIGS. 7 to 9, there is described a display of the finished image 7 for each setting item (setting value) in the operation panel 1 according to the embodiment.

The operation panel 1 of this embodiment displays the all setting value image 71 (indicating a job execution result). However, there is a case where it is difficult to understand which process is performed (reflected) by which setting value among the plurality of setting values. Therefore, when the touch panel unit 12 accepts a predetermined separating operation in a state of displaying the finished image 7 on which the plurality of setting values are reflected (for example, the all setting value image 71 or a combination setting value image 73 described later), the panel control unit 10 controls the display unit 11 to display a separate setting value image 72. The separate setting value image 72 is an image on which only one setting value is reflected and the default setting value is used or other setting items. When there are a plurality of set setting values, the panel control unit 10 controls to display a plurality of separate setting value images 72.

The predetermined separating operation can be determined appropriately. In the operation panel 1 of this embodiment, the touch panel unit 12 (panel control unit 10) accepts a gesture operation of pinch out (operation of touching two points and then extending a distance between the two points) in an area outside the finished image 7 on the touch panel unit 12 as the separating operation.

When the separating operation is performed in a state of displaying the finished image 7 on which a plurality of setting values are reflected like the all setting value image 71, as the diagram illustrated in the lower side in FIG. 7, the panel control unit 10 controls the display unit 11 to display a plurality of finished images 7 (separate setting value images 72) on which only one setting value is reflected for each type of the set setting value switching from the all setting value image 71.

When the all setting value image 71 or the separate setting value image 72 is displayed based on the image data of the document that is actually read, the storage device 42 or the memory 14 stores the image data of the one or more document sheets obtained by reading. Then, the panel control unit 10 (or the image processing portion 44) performs image processing on the image data obtained by reading in which only one setting value is reflected for each set setting value (or the default setting value is used for the setting item that is not set), and the image processing for matching the number of dots with that of the display area of the finished image 7. Then, the panel control unit 10 generates a plurality of finished image data D4 for displaying the separate setting value images 72 in the same number as the setting values set by the user.

In addition, fixed image data prepared in advance may be used as the image data to be a base of displaying the finished image 7. In this case, the image data to be a base of displaying the finished image 7 is stored in advance in the memory 14 or the storage device 42. When the image data prepared in advance is used, the panel control unit 10 (or the image processing portion 44) reads out the image data prepared in advance, and performs image processing on the read image data for each set setting value, in which only one setting value is reflected (or the default setting value is used for the setting item that is not set), so as to generate a plurality of finished image data D4 for displaying the separate setting value images 72 in the same number as the setting value set by the user. In addition, the image processing for matching the number of dots with that of the display area of the finished image 7 is also performed as necessary.

Then, the panel control unit 10 controls the display unit 11 to display the separate setting value images 72 one by one in an overlaid manner on the display unit 11 based on the generated finished image data D4 for displaying the plurality of separate setting value images 72.

When the separating operation is performed in a state where the four setting value are set, including "2 in 1", "Bottom middle in the form of -#-", "Centering", "Auto (automatic zoom)" in one copying job, the panel control unit 10 controls the display unit 11 to display the four separate setting value images 72 as illustrated in FIG. 7. Among the separate setting value images 72 illustrated in FIG. 7, the leftmost separate setting value image 72 indicates the finished image 7 in a state where only the setting value of "Auto (automatic zoom)" is set. The second separate setting value image 72 from the left indicates the finished image 7 in a state where only the setting value of "Centering (margin/centering process)" is set. The third separate setting value image 72 from the left indicates the finished image 7 in a state where only the setting value of "2 in 1" is set. The rightmost separate setting value image 72 indicates the finished image 7 in a state where only the setting value of "Bottom middle in the form of -#-" is set. Note that the direction of the document is rotated by 90 degrees in the 2 in 1 print. Therefore, in the separate setting value images 72 other than the setting value of 2 in 1, the direction of the document is different from that in the all setting value image 71.

In addition, when the touch panel unit 12 accepts a predetermined returning operation in the state where the separate setting value images 72 are displayed, the panel control unit 10 controls the display unit 11 to display the all setting value image 71 as the finished image 7 switching from the separate setting value image 72.

The predetermined returning operation can be determined appropriately. The touch panel unit 12 (panel control unit 10) of this embodiment accepts a gesture operation of pinch in (operation of touching two points and then narrowing a distance between the two points) in an area outside all the separate setting value images 72 on the touch panel unit 12 as the returning operation.

When the returning operation is performed in the state where the separate setting value image 72 is displayed as the finished image 7, the state of the diagram on the lower side in FIG. 7 is switched to the state illustrated in the upper side in FIG. 7 (display state of the all setting value image 71). In this way, the panel control unit 10 controls the display unit 11 to stop the display of the separate setting value image 72 and to display the all setting value image 71 instead. The image data for displaying the all setting value image 71 can be the one generated before. In this way, when the operation input unit (the touch panel unit 12, the hardware key 13, or the like) accepts the predetermined separating operation in the state of displaying the finished image 7 on which the plurality of set setting values are reflected, the display unit 11 displays a plurality of separate setting value images 72 for each set setting value as the finished image 7, on which only one setting value is reflected and the default setting values are used for other setting items. On the other hand, when the operation input unit accepts the predetermined returning operation in the state where the plurality of separate setting value images 72 are displayed, the display unit 11 displays the all setting value image 71 instead of the separate setting value images 72. In this way, the user can check a difference from the default setting image 8 for each setting value (setting item). Therefore, the user can check how the obtained result is different by setting one setting item and can easily understand content of the process performed base on the selected setting item and the set setting value.

A size of the display unit 11 is limited. When there are a plurality of setting values set by the user, the panel control unit 10 controls the display unit 11 to display so that the separate setting value images 72 are overlapped partially. Therefore, there is a case where it is difficult to visually check the separate setting value image 72 on a lower layer.

Therefore, when the touch panel unit 12 accepts the operation of selecting one of the overlapped separate setting value images 72, the panel control unit 10 controls the display unit 11 to display the selected separate setting value image 72 on the top layer.

The operation of selecting one of the overlapped separate setting value images 72 can be determined appropriately. The separate setting value image 72 is assigned with a tab having a setting item name of the setting value that is reflected. In this way, it is easy to recognize which setting item and setting value are reflected on the separate setting value image 72. The operation of touching the display position of the tab may be regarded as the selecting operation. In addition, an operation of touching an area in one of the overlapped separate setting value images 72 and releasing before being determined to be the long press may be regarded as the operation of selecting the separate setting value image 72.

FIG. 8 illustrates and example of selecting the separate setting value image 72 corresponding to the setting item of the page number insertion among the plurality of separate setting value images 72 (setting value of "Bottom middle in the form of -#-"). When the separate setting value image 72 is touched, the panel control unit 10 controls the display unit 11 to display the separate setting value image 72 corresponding to the setting item of the page number insertion on the top layer (the frontmost layer or the uppermost layer). In this way, it is possible to arbitrarily switch the separate setting value image 72 to be displayed on the top layer.

In addition, when a predetermined second switching condition is satisfied while the separate setting value image 72 is displayed, or when the touch panel unit 12 accepts a predetermined second switching operation, the panel control unit 10 controls to display the default setting image 8 in a display area of the separate setting value image 72. The default setting image 8 is the same as that described above.

The predetermined second switching condition can be determined appropriately. In the operation panel 1 of this embodiment, the second switching condition is that a predetermined period of time (for example, approximately 5 to 10 seconds) has passed after the input to the operation panel 1 (touch of the touch panel unit 12, the hardware key 13, or the function selection key 133) is vanished. The second switching condition may be the same as the first switching condition.

In addition, the predetermined second switching operation can be determined appropriately. In the operation panel 1 of this embodiment, the long press to the panel control unit 10 (touch panel unit 12) (continuous touch at the same position for a predetermined period of time such as approximately one to a few seconds) is accepted as the second switching operation. Note that the second switching operation may be other gesture operations such as a flick operation.

Further, when the predetermined second switching condition is satisfied, or when the touch panel unit 12 accepts the predetermined second switching operation, in a state of displaying the default setting image 8 in the area of the separate setting value image 72, the panel control unit 10 controls the display unit 11 to display the separate setting value image 72 that was displayed before, switching from the default setting image 8. In this way, it is possible to switch between the default setting image 8 and the separate setting value image 72 so as to compare them. In this way, when the second switching condition is satisfied, or when the operation input unit (the touch panel unit 12, the hardware key 13, or the like) accepts the second switching operation, the display unit 11 switches the display of one or more separate setting value images 72 to the default setting image 8 in the state of displaying the separate setting value images 72. In addition, in the state where the default setting image 8 is displayed instead of the separate setting value images 72, the display unit 11 switches the display of the default setting image 8 to the separate setting value images 72 that were displayed before. In this way, the finished image 7 (separate setting value images 72) on which one setting value is reflected and the default setting image 8 are alternately switched and displayed. In other words, because a different part between the separate setting value image 72 and the default setting image 8 appears and disappears, the different part is displayed in an emphasized manner. Further, the user can compare the finished image 7 and the default setting image 8 repeatedly so as to check the difference between them. Therefore, the user can correctly grasp a difference between the default setting value and the one set setting value when the job is executed.

Here, as illustrated in FIG. 9, the panel control unit 10 may perform the display switching between the separate setting value image 72 and the default setting image 8 only on a part or one of the plurality of separate setting value images 72. In this case, the panel control unit 10 may control the display unit 11 to perform the display switching between the separate setting value image 72 and the default setting image 8 in the display area of the separate setting value image 72 of the top (frontmost) layer. In addition, the panel control unit 10 may perform the display switching in the display area of the separate setting value image 72 on which the second switching operation (long press) is performed as illustrated in FIG. 9. In this way, when the operation input unit accepts the operation of selecting one of the overlapped separate setting value images 72, the display unit 11 displays the selected separate setting value image 72 on the frontmost layer and performs the display switching between the default setting image 8 and the separate setting value image 72 only for the separate setting value image 72 on the frontmost layer. In this way, it is possible to select the finished image 7 (separate setting value image 72) on which the specific one setting value is reflected (associated). Therefore, by selecting the separate setting value image 72 corresponding to an unknown setting value, the user can visually compare the case of the default setting value with the case of setting the setting value for the specific setting value (check a difference between the default value and a changed setting value). Therefore, the user can correctly grasp a difference between the default setting value and the one set setting value when the job is executed. In addition, because only one image is switched in the display, the process for the display is a light load, and it is not visually complicated. Note that the panel control unit 10 may control to perform the display switching between the separate setting value image 72 and the default setting image 8 in the display area of the all the separate setting value images 72.

In addition, the image forming apparatus (multifunction peripheral 100) according to the embodiment includes the display input device (operation panel 1) described above. In this way, it is possible to provide the image forming apparatus in which the user can visually compare the finished image 7 with the default setting image 8 so as to easily check a difference between the case where the user sets the setting value of the selected setting item and the case where the user does not set the same. Therefore, it is possible to provide the image forming apparatus in which setting is easily understood.

(Display of Finished Image 7 with Combined Setting Values)

Figure 10:
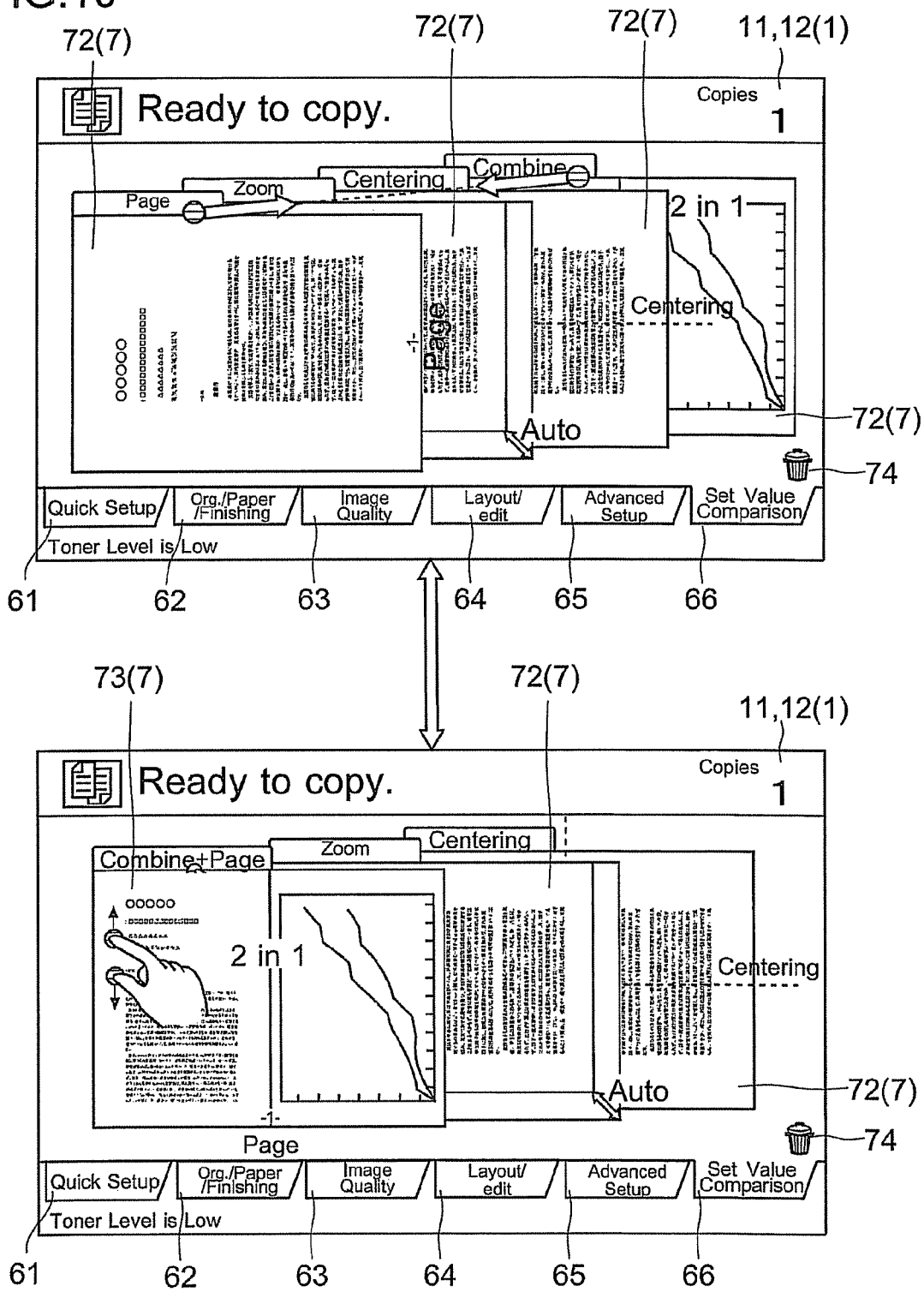
FIG. 10 is a diagram illustrating an example of a display of the finished image in which the setting items (setting values) are combined in the operation panel of the embodiment.
Figure 11:
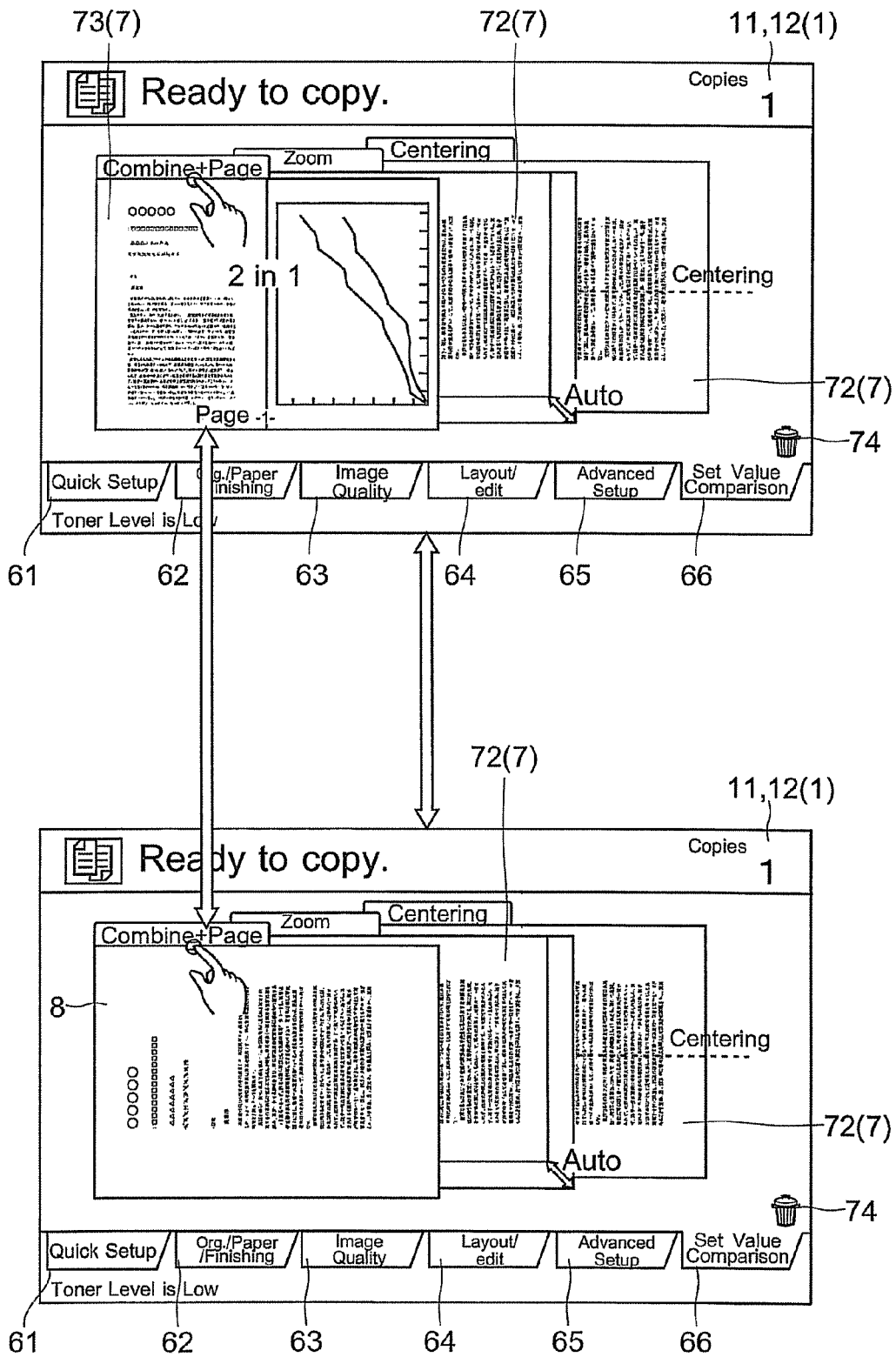
FIG. 11 is a diagram for explaining an example of display switching between a combination setting value image and the default setting image according to the embodiment.

Next, with reference to FIG. 10 and FIG. 11, there is described a display of the finished image 7 with combined setting values in the operation panel 1 according to the embodiment.

In the operation panel 1, the separate setting value image 72 can be displayed for each setting value set by the user. Here, when the finished image 7 with specific combined setting values among the plurality of set setting values can be displayed instead of one setting value unit, it is easy to determine whether or not the set setting value is necessary. In other words, when it is possible to display the finished image 7 on which specific setting values among the plurality of setting values are reflected or are not reflected, the user can easily determine whether or not the setting is necessary.

Therefore, when a predetermined combining operation is accepted after the operation of selecting a plurality of images among the displayed finished images 7, the panel control unit 10 controls the display unit 11 to display the combination setting value image 73 switching from the selected finished images 7 (separate setting value images 72). The combination setting value image 73 is an image on which a combination of setting values corresponding to the selected plurality of finished images 7 is reflected. As to other setting items, the default setting values are used for the combination setting value image 73. In this way, the user can view a display of the finished image 7 (combination setting value image 73) on which the combination of the selected setting values is reflected. Therefore, by checking the combination setting value image 73, the user can determine whether or not a part of the set setting values are necessary.

The predetermined combining operation can be determined appropriately. The panel control unit 10 (touch panel unit 12) of this embodiment accepts a gesture operation as the combining operation, in which positions in a display area of the plurality of finished images 7 are touched, and a distance between the touched positions is narrowed (operation in which a plurality of points in the display area of the plurality of finished images 7 are touched, and then a distance between two of the touched points is narrowed). In this way, the operation input unit (the touch panel unit 12, the hardware key 13, or the like) includes the touch panel unit 12 disposed on the display unit 11, and the touch panel unit 12 accepts various gesture operations such as the combining operation. In this way, a display on the display unit 11 of the display input device (operation panel 1) can be operated by a simple operation, and it is possible to easily perform switching between the finished image 7 and the default setting image 8, separation of the finished image 7, and combination of the same.

As illustrated in FIG. 10, the combination setting value image 73 displayed by the combining operation is also provided with tabs having the setting item names (or the setting value names) of the setting values reflecting on the image. In other words, the finished image 7 other than the all setting value image 71 is provided with the tabs having one or more setting item names or the setting values reflecting on the image.

Therefore, it is possible to accept an operation as the combining operation, in which a plurality of display positions of the tabs assigned to the separate setting value images 72 and the combination setting value image 73 are touched and a distance between the two touched positions is narrowed. Note that it is possible to accept an operation as the combining operation, in which a plurality of positions in the display area of the plurality of finished images 7 including the plurality of separate setting value images 72, the combination setting value image 73, and the tabs are touched and a distance between the touched positions is narrowed.

When the separate setting value image 72 is displayed based on actually read image data of a document, the storage device 42 or the memory 14 stores image data of one or more document sheets obtained by reading. Then, the panel control unit 10 (or the image processing portion 44) performs image processing on the image data obtained by reading for reflecting the combined setting values (or the default setting value is used for the setting item that is not set), and the image processing for matching the number of dots with that of the display area of the finished image 7. Then, the panel control unit 10 generates the finished image data D4 for displaying the combination setting value image 73.

In addition, similarly to the case of the all setting value image 71 or the separate setting value image 72, fixed image data prepared in advance may be used as the image data to be a base of displaying the finished image 7. In this case, the image data to be a base of displaying the finished image 7 is stored in advance in the memory 14 or the storage device 42. When the image data prepared in advance is used, the panel control unit 10 (or the image processing portion 44) reads out the image data prepared in advance and performs image processing on the read image data, for reflecting the combined setting value (while using the default setting value for the setting item that is not set). Then, the panel control unit 10 (image processing portion 44) generates the finished image data D4 for displaying the combination setting value image 73 indicated by the result of the setting values for which the user instructs to combine. In addition, the image processing for matching the number of dots with that of the display area of the combination setting value image 73 is also performed as necessary.

Then, the panel control unit 10 controls the display unit 11 to display the combination setting value image 73 based on the generated finished image data D4.

The diagram on the upper side of FIG. 10 illustrates the combining operation for combining the setting value "2 in 1" and the setting value "Bottom middle in the form of -#-". When this combining operation is performed, as illustrated in the diagram on the lower side of FIG. 10, the panel control unit 10 controls the display unit 11 to display the combination setting value image 73 indicting a result of executing the job with the setting values of "2 in 1" and "Bottom middle in the form of -#-". When starting to display the combination setting value image 73, the panel control unit 10 may control the display unit 11 to display the combination setting value image 73 on the top layer (frontmost layer).

Among the finished images 7 illustrated in the lower side of FIG. 10, the leftmost finished image 7 illustrates the combination setting value image 73 in which the setting values "2 in 1" and "Bottom middle in the form of -#-" are combined. The second finished image 7 from the left illustrates the separate setting value image 72 in which only the setting value "automatic zoom (auto)" is set. The third separate setting value image 72 from the left illustrates the separate setting value image 72 in which only the setting value "margin/centering (Centering)" is set.

Further, when the touch panel unit 12 accepts the separating operation (pinch out operation) outside the area of the finished image 7 in a state where the combination setting value image 73 is displayed, the panel control unit 10 controls the display unit 11 to display the separate setting value image 72 for each setting value reflecting on the combination setting value image 73 switching from the combination setting value image 73.

In addition, FIG. 10 illustrates the combination setting value image 73 on which the two setting items (setting values) are reflected, but the panel control unit 10 can control to display the combination setting value image 73 on which three or more setting items (setting values) are reflected. For instance, when the combining operation is performed in which the display area of the combination setting value image 73 on which the two setting items (setting values) are reflected is touched while another display area of the combination setting value image 73 or the separate setting value image 72 is touched, and a distance between the two touched positions is narrowed, the panel control unit 10 controls the display unit 11 to display the combination setting value image 73 on which three or more setting values are reflected.

In addition, when the returning operation is performed in a state where a plurality of combination setting value images 73, or the combination setting value image 73 and the separate setting value image 72 are displayed as the finished image 7, the panel control unit 10 controls the display unit 11 to stop the display of the plurality of finished images 7 (combination setting value image 73 and separate setting value image 72), and controls to display the all setting value image 71 instead. The image data for displaying the all setting value image 71 can be the one generated before.

Here, when the touch panel unit 12 accepts the operation of selecting one of the overlapped finished images 7 in the state where the plurality of combination setting value images 73, or the combination setting value image 73 and the separate setting value image 72 are displayed as the finished image 7, the panel control unit 10 displays the selected finished image 7 (combination setting value image 73 or the separate setting value image 72) on the frontmost layer.

In addition, when a predetermined third switching condition is satisfied or the touch panel unit 12 accepts a predetermined third switching operation in the state where the combination setting value image 73 is displayed, the panel control unit 10 controls to display the default setting image 8 in the display area of the combination setting value image 73. The default setting image 8 is the same as that described above.

The predetermined third switching condition can be determined appropriately. In the operation panel 1 of this embodiment, the third switching condition is that a predetermined period of time (for example, approximately 5 to 10 seconds) has passed after the input to the operation panel 1 (touch of the touch panel unit 12, the hardware key 13, or the function selection key 133) is vanished. The third switching condition may be the same as the first switching condition or the second switching condition.

In addition, the predetermined third switching operation can be determined appropriately. In the operation panel 1 of this embodiment, similarly to the first switching operation and the second switching operation, the third switching operation is a long press to the touch panel unit 12 (continuous touch at the same position for a predetermined period of time such as approximately one to a few seconds).

Further, when the third switching condition is satisfied, or when the touch panel unit 12 accepts the third switching operation, in the state where the default setting image 8 is displayed in the area of the separate setting value image 72, the panel control unit 10 controls the display unit 11 to display the combination setting value image 73 that was displayed before, switching from the default setting image 8. In this way, when the third switching condition is satisfied, or when the operation input unit (the touch panel unit 12, the hardware key 13, or the like) accepts the third switching operation, the display unit 11 switches the display from the combination setting value image 73 to the default setting image 8 in the state where the combination setting value image 73 is displayed, and switches the display from the default setting image 8 to the combination setting value image 73 that was displayed before in the state where the default setting image 8 is displayed. In this way, the finished image 7 (combination setting value image 73) on which the selected setting value is reflected and the default setting image 8 among the plurality of set setting values are alternately switched and displayed. In other words, because a different part between the separate setting value image 72 and the default setting image 8 appears and disappears, the different part is displayed in an emphasized manner. Therefore, the user can compare the finished image 7 and the default setting image 8 repeatedly so as to check the difference between them. Therefore, the user can correctly determine whether or not a desired result will be obtained by the combination of the plurality of setting values.

Here, as illustrated in FIG. 11, the panel control unit 10 may perform the display switching between the combination setting value image 73 and the default setting image 8 on a part or only one of the plurality of the displayed finished images 7 (the combination setting value image 73 and the separate setting value image 72). In this case, the panel control unit 10 may perform the display switching between the combination setting value image 73 and the default setting image 8 only in the display area of the combination setting value image 73. In addition, the panel control unit 10 may perform the display switching on the combination setting value image 73 on which the third switching operation (long press) is performed as illustrated in FIG. 9. In addition, on the contrary, the panel control unit 10 may perform the display switching between the separate setting value image 72 and the default setting image 8 in the display area of all the combination setting value images 73.

(Cancellation of Setting Value)

Figure 12:
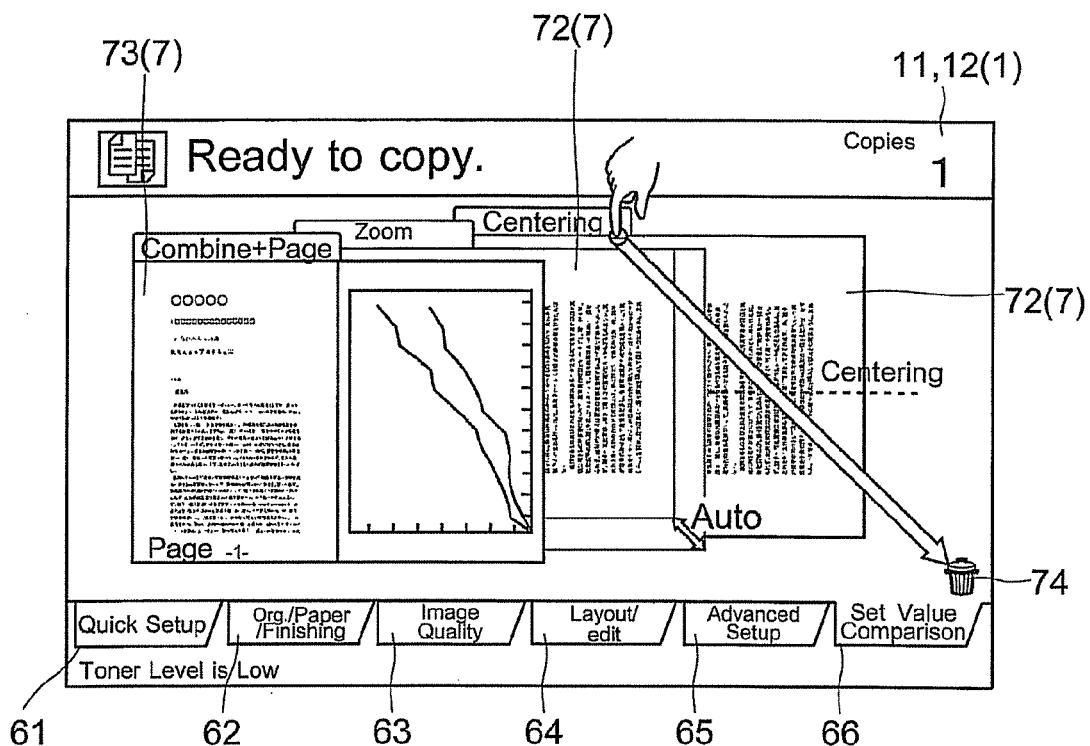
FIG. 12 is a diagram for explaining an operation performed on the finished image to cancel a setting value in the operation panel according to this embodiment.

Next, with reference to FIG. 12, operation on the finished image 7 for canceling the setting value in the operation panel 1 of this embodiment is described.

When the finished image 7 is displayed by pressing the set value comparison tab 66 or the like, the panel control unit 10 controls to display a canceling image 74 for performing an operation for canceling the setting value (for resetting to the default value) in the screen of the display unit 11. As illustrated in FIGS. 6 to 12, the canceling image 74 is a trash box image, for example. However, the canceling image 74 can be determined appropriately (for example, may be a mark "x").

Then, the touch panel unit 12 accepts an operation for canceling the setting value set by the user and restoring the default setting value. This operation can be determined appropriately. In the operation panel 1 of this embodiment, the touch panel unit 12 (panel control unit 10) accepts an operation performed on the canceling image 74 after selecting one of the finished images 7 (the all setting value image 71, the separate setting value image 72, and the combination setting value image 73) as the operation of canceling the setting value corresponding to the selected finished image 7 and restoring the default setting value. In this way, without performing the setting again after displaying again the setting screen corresponding to the unnecessary setting value, a part of setting can be canceled (deleted) by the operation in the display of the finished image 7. Therefore, the user can easily perform the setting again (restoring the default value).

Specifically, an operation of touching one of the finished images 7 (the all setting value image 71, the separate setting value image 72, and the combination setting value image 73), or the display position of the tab assigned to the finished image 7 is accepted as the operation of selecting the finished image 7. Then, the touch panel unit 12 accepts an operation of moving the touched position to the canceling image 74 while keeping the touching state without releasing a finger (drag operation) as the operation for canceling the setting value.

FIG. 12 illustrates an example in which the finished image 7 (separate setting value image 72) on which the setting value "Centering" is reflected is selected and the drag operation is performed so as to cancel the setting value "Centering" (to restore the default value "not centering"). In this way, without displaying again the setting screen of the setting value to be canceled, it is possible to restore the default setting value.

When the touch panel unit 12 accepts the operation of canceling the setting value, the panel control unit 10 controls the memory 14 to update the set content data D3. Specifically, the panel control unit 10 updates the set content data D3 in the memory 14 to be data indicating that the canceled setting value is not set. In this way, the job is executed without reflecting the canceled setting value. For instance, in the example of FIG. 12, the margin/centering process is not performed when the copying job is executed.

Although the embodiment of the present disclosure is described above, the scope of the present disclosure is not limited to this description. The present disclosure can be embodied with various modifications within the scope without deviating from the spirit of the disclosure.

The present disclosure can be used for a display input device or an image forming apparatus, which includes a display unit and a touch panel unit, and displays a preview image (finished image).

What is claimed is:

1. A display input device, comprising:
a storage unit configured to store a set setting value and a default setting value of each setting item used in a case where the setting value is not set;
an operation input unit configured to accept setting of the setting value; and
a display unit configured to display a screen for selecting the setting item and for setting the setting value of the selected setting item, and to alternately display a finished image for checking a result when a job is executed with the set setting value reflected, and a default setting image on which the default setting value is reflected for checking a result when the job is executed based on the default setting value, by switching between them,
wherein
when the operation input unit accepts a predetermined separating operation in a state of displaying the finished image on which a plurality of set setting values are reflected, the display unit displays a plurality of separate setting value images for individual set setting values as the finished image, on which only one setting value is reflected while using the default setting value for other setting items, and
when the operation input unit accepts a predetermined returning operation in a state of displaying the separate setting value image, the display unit displays the all setting value image switching from the separate setting value image.

2. The display input device according to claim 1, wherein when a predetermined second switching condition is satisfied, or when the operation input unit accepts a predetermined second switching operation, the display unit switches the display of one or more of the separate setting value images to the default setting image in a state of displaying the separate setting value images, while the display unit switches the display of the default setting image to the separate setting value image that was displayed before in a state of displaying the default setting image switching from the separate setting value image.

3. The display input device according to claim 2, wherein the display unit displays the separate setting value images to be overlapped partially,
when the operation input unit accepts an operation of selecting one of the overlapped separate setting value images, the display unit displays the selected separate setting value image on a frontmost layer, and the display unit performs the display switching between the default setting image and the separate setting value image only for the frontmost separate setting value image.

4. The display input device according to claim 1, wherein when the operation input unit accepts a predetermined combining operation after selecting a plurality of images among the displayed finished images, the display unit displays a combination setting value image on which a combination of a plurality of setting values corresponding to the selected finished images is reflected while using the default setting value for other setting items as the finished image, switching from the selected finished images.

5. The display input device according to claim 4, wherein when a predetermined third switching condition is satisfied, or when the operation input unit accepts a predetermined third switching operation, the display unit switches the display from the combination setting value image to the default setting image in a state of displaying the combination setting value image, while the display unit switches the display from the default setting image to the combination setting value image that was displayed before in a state of displaying the default setting image.

6. The display input device according to claim 1, wherein
the display unit displays a canceling image for operation of canceling the setting, and
the operation input unit accepts selection of the finished image and an operation on the canceling image as an operation of canceling the set setting value to restore the default setting value corresponding to the selected finished image.

7. The display input device according to claim 1, wherein
the operation input unit includes a touch panel unit disposed on the display unit, and
the touch panel unit accepts a gesture operation.

8. The display input device according to claim 1, wherein the display unit displays a set value comparison tab for selecting the setting item in each selection screen, and displays an all setting value image on which all the setting value set by the user are reflected as a first stage of the finished image when an operation of a display position of the set value comparison tab is performed.

9. The display input device according to claim 1, wherein the display unit displays the finished image provided with a character string indicating the set setting value and the setting item.

10. The display input device according to claim 1, wherein the display unit displays the separate setting value image provided with a tab having the setting item name of the setting value reflecting on the image.

11. An image forming apparatus comprising the display input device according to claim 1.

12. A display input device, comprising:
a storage unit configured to store a set setting value and a default setting value of each setting item used in a case where the setting value is not set;
an operation input unit configured to accept setting of the setting value; and
a display unit configured to display a screen for selecting the setting item and for setting the setting value of the selected setting item, and to alternately display a finished image for checking a result when a job is executed with the set setting value reflected, and a default setting image on which the default setting value is reflected for checking a result when the job is executed based on the default setting value, by switching between them, wherein
the display unit displays an all setting value image on which all the set setting values are reflected as the finished image, and
when a predetermined period of time has passed after a stop of input to the operation input unit, or when a long press on the operation input unit is accepted, the display is switched from the all setting value image to the default setting image in a state of displaying the all setting value image, while the display is switched from the default setting image to the all setting value image in a state of displaying the default setting image.

13. A control method for a display input device, the method comprising the steps of:
storing a set setting value and a default setting value of each setting item used in a case where the setting value is not set;
accepting setting of the setting value;
displaying a screen for selecting the setting item and for setting the setting value of the selected setting item;
alternately displaying a finished image for checking a result when a job is executed with the set setting value reflected, and a default setting image on which the default setting value is reflected for checking a result when the job is executed based on the default setting value, by switching between them;
displaying, when a predetermined separating operation is accepted in a state of displaying the finished image on which a plurality of set setting values are reflected, a plurality of separate setting value images for individual set setting values as the finished image, on which only one setting value is reflected while using the default setting value for other setting items, and
displaying, when a predetermined returning operation is accepted in a state of displaying the separate setting value image, the all setting value image switching from the separate setting value image.

* * * * *